(12) United States Patent
Shinoda et al.

(10) Patent No.: US 10,162,332 B2
(45) Date of Patent: Dec. 25, 2018

(54) SERVOMOTOR CONTROL DEVICE, SERVOMOTOR CONTROL METHOD, AND COMPUTER-READABLE RECORDING MEDIUM

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/696,681

(22) Filed: Sep. 6, 2017

(65) Prior Publication Data

US 2018/0067469 A1    Mar. 8, 2018

(30) Foreign Application Priority Data

Sep. 8, 2016  (JP) ................... 2016-175830

(51) Int. Cl.
*G05B 19/404* (2006.01)

(52) U.S. Cl.
CPC .. *G05B 19/404* (2013.01); *G05B 2219/39177* (2013.01); *G05B 2219/39188* (2013.01)

(58) Field of Classification Search
None
See application file for complete search history.

(56) References Cited

U.S. PATENT DOCUMENTS

| 8,896,255 B2 | 11/2014 | Iwashita et al. |
| 2013/0320908 A1 | 12/2013 | Iwashita et al. |
| 2014/0156080 A1 | 6/2014 | Iwashita et al. |

FOREIGN PATENT DOCUMENTS

| JP | 2014-013554 A | 1/2014 |
| JP | 2014-109785 A | 6/2014 |

*Primary Examiner* — Mohammad Ali
*Assistant Examiner* — Saad M Kabir
(74) *Attorney, Agent, or Firm* — Studebaker & Brackett PC

(57) ABSTRACT

A servomotor control device includes a servomotor; a driven body configured to be driven by the servomotor; a connection mechanism configured to connect the servomotor and driven body, and transmit power of the servomotor to the driven body; a position command generation unit configured to generate a position command value; a motor control unit configured to control the servomotor using the position command value; a position command compensation unit including a force estimation part configured to estimate a drive force acting on the driven body at the connection mechanism, and a compensation amount generation part configured to generate a compensation amount for compensating the position command value based on the estimated drive force; and a restriction part configured to restricting updating of the compensation amount when a command acceleration or a command velocity of the position command value is no more than a desired value.

11 Claims, 14 Drawing Sheets

SERVOMOTOR CONTROL DEVICE, SERVOMOTOR CONTROL METHOD, AND COMPUTER-READABLE RECORDING MEDIUM

This application is based on and claims the benefit of priority from Japanese Patent Application No. 2016-175830, filed on 8 Sep. 2016, the content of which is incorporated herein by reference.

BACKGROUND OF THE INVENTION

Field of the Invention

The present invention relates to a servomotor control device having a function of compensating the position of a driven body that is driven by the power of a servomotor, a servomotor control method, and a computer-readable recording medium.

Related Art

Conventionally, there are servomotor control devices which install a workpiece (work) on a table, and cause this table to move via a connection mechanism by a servomotor. The table and workpiece are driven bodies. The connection mechanism has a coupling which is connected to the servomotor, and a ball screw which is fixed to the coupling. The ball screw is threaded to a nut. Among such a servomotor control devices, there is a servomotor control device having a function of compensating the position of a driven body (referred to as mobile body) that is driven by the power of the servomotor.

For example, the servo control device described in Patent Document 1 estimates the drive force acting on the driven body at the connecting part of the connection mechanism, and corrects the position command value based on the drive force thus estimated. In addition, the servo control device described in Patent Document 2 calculates the stretch amount of the ball screw from a distance from the servomotor until the mobile body, and the torque command value, calculates a position compensation amount for the mobile body threaded to the ball screw from this stretch amount, and corrects the position command value according to this position compensation amount.

Patent Document 1: Japanese Unexamined Patent Application, Publication No. 2014-109785

Patent Document 2: Japanese Unexamined Patent Application, Publication No. 2014-13554

SUMMARY OF THE INVENTION

The present inventors have found that, in the case of compensating the position command value, a compensation reacting to the drive force estimated and unrelated to the mechanical operation is applied to the position command value, whereby oscillation of the compensation amount arises. The present invention has an object of providing a servomotor control device for a machine tool or industrial machine capable of position control of a driven body with higher precision, a servomotor control method, and a computer-readable recording medium.

According to a first aspect of the present invention, a servomotor control device includes: a servomotor; a driven body configured to be driven by the servomotor; a connection mechanism configured to connect the servomotor and the driven body, and transmit power of the servomotor to the driven body; a position command generation unit configured to generate a position command value for the driven body; a motor control unit configured to control the servomotor using the position command value; and a position command compensation unit including a force estimation part configured to estimate a drive force acting on the driven body at a connecting part with the connection mechanism, and a compensation amount generation part configured to generate a compensation amount for compensating the position command value generated by the position command generation unit, based on a drive force estimated by the force estimation part, in which the position command compensation unit includes a restriction part configured to restrict updating of the compensation amount, when a command acceleration of the position command value is no more than a desired value, or when a command velocity of the position command value is no more than a desired value.

According to a second aspect of the present invention, in the servomotor control device as described in the first aspect, it may be configured so that restriction of the updating of the compensation amount by the restriction part interrupts updating in which the magnitude of the compensation amount increases.

According to a third aspect of the present invention, in the servomotor control device as described in the first aspect, it may be configured so that restriction of the updating of the compensation amount by the restriction part interrupts the updating of the compensation amount.

According to a fourth aspect of the present invention, in the servomotor control device as described in any one of the first to third aspects, it may be configured so that the restriction part includes a filter that suppresses a change from a compensation amount that was restricted, to a compensation amount after updating, when restarting the updating of the compensation amount.

According to a fifth aspect of the present invention, in the servomotor control device as described in any one of the first to third aspects, it may be configured so that the motor control unit includes a velocity command creation part and a torque command creation part, the torque command creation part includes at least an integrator that integrates a speed deviation, and the restriction part performs overwriting of the integrator when restarting the updating of the compensation amount.

According to a sixth aspect of the present invention, in a servomotor control method for a servomotor control device including: a servomotor; a driven body configured to be driven by the servomotor; and a connection mechanism configured to connect the servomotor and the driven body, and transmit power of the servomotor to the driven body, the method includes the steps of: generating a position command value for the driven body; estimating drive force acting on the driven body at a connecting part with the connection mechanism; generating a compensation amount for compensating the position command value based on the drive force thus estimated; restricting updating of the compensation amount when a command acceleration of the position command value is no more than a desired value, or when a command velocity of the position command value is no more than a desired value; and controlling the servomotor using the position command value for which updating was restricted.

According to a seventh aspect of the present invention, in the servomotor control method as described in the sixth aspect, restricting of the updating of the compensation amount may be interrupting updating in which the magnitude of the compensation amount increases.

According to an eighth aspect of the present invention, in the servomotor control method as described in the sixth aspect, restricting of the updating of the compensation amount may be interrupting the updating of the compensation amount.

According to an ninth aspect of the present invention, the servomotor control method as described in any one of the sixth to eighth aspects may further include a step of suppressing, by way of a filter, a change from a compensation amount that was restricted, to a compensation amount after updating, when restarting the updating of the compensation amount.

According to a tenth aspect of the present invention, the servomotor control method as described in any one of the sixth to eighth aspects may further include: creating a velocity command using the position command value in which updating was restricted, creating a torque command using the velocity command thus created, and controlling the servomotor using the torque command, wherein the creating of the torque command is performed using an integrator that at least integrates a speed deviation; and performing overwriting of the integrator when restarting the updating of the compensation amount.

According to an eleventh aspect of the present invention, in a non-transitory computer-readable recording medium encoded with a servomotor control program which enables a computer to execute servomotor control in a servomotor control device that includes a servomotor, a driven body configured to be driven by the servomotor, and a connection mechanism configured to connect the servomotor and the driven body, and transmit power of the servomotor to the driven body, the program causes the computer to execute processing of: generating a position command value for the driven body; estimating drive force acting on the driven body at a connecting part with the connection mechanism; generating a compensation amount for compensating the position command value based on the drive force thus estimated; restricting updating of the compensation amount when a command acceleration of the position command value is no more than a desired value, or when a command velocity of the position command value is no more than a desired value; and controlling the servomotor using the position command value for which updating was restricted.

According to the present invention, high precision position control of a driven body becomes possible which prevents oscillation of the compensation amount arising from a compensation reacting to the estimated drive force which is not related with the mechanical operation being applied to the position command value, even during stop or low-velocity operation.

DETAILED DESCRIPTION OF THE INVENTION

Figure 1:
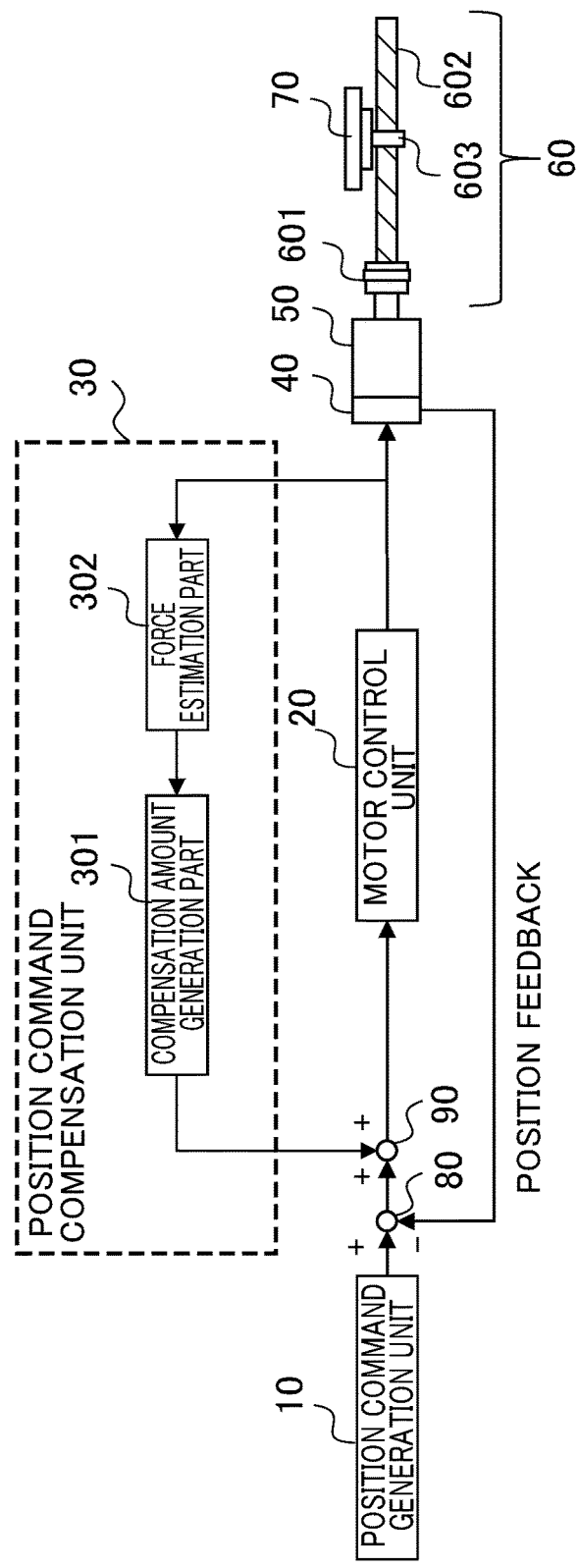
FIG. 1 is a block diagram showing the configuration of a servomotor control device serving as a technical premise.

Hereinafter, embodiments of the present invention will be explained using the drawings. First, a servomotor control device serving as a technical premise will be explained prior to the explanation of the embodiments of the present invention. FIG. 1 is a block diagram showing the configuration of a servomotor control device serving as a technical premise. The servomotor control device causes a table 70 to move via a connection mechanism 60 by a servomotor 50, and processes a workpiece (work) mounted on the table 70. The table 70 and the workpiece serve as a driven body. The connection mechanism 60 has a coupling 601 connected to the servomotor 50 and a ball screw 602 that is fixed to the coupling, in which a nut 603 is threaded to the ball screw 602. By way of rotational driving of the servomotor 50, the nut 603 threaded with the ball screw 602 moves in the axial direction of the ball screw 602.

The rotation angle position of the servomotor 50 is detected by an encoder 40 associated with the servomotor 50 and serving as a position detection unit, and the detected position (position detected value) is used as a position feedback. It should be noted that the encoder 40 is capable of detecting the rotational velocity, and the detected velocity (velocity detected value) can be used as a velocity feedback. The servomotor control device has a position command generation unit 10, motor control unit 20, position command compensation part 30, subtracter 80, and adder 90. The position command generation unit 10 creates a position command value of the servomotor 50, following a program or instruction inputted from a higher-order control device or external input device, which are not illustrated. The subtracter 80 obtains a difference between a position command value created by the position command generation unit 10, and a position detected value detected by the encoder 40. The adder 90 adds the difference outputted from the subtracter 80 and a compensation value outputted from the position command compensation part 30. The motor control unit 20 creates a torque command value for the servomotor 50 using the added value outputted from the adder 90.

During driving of the servomotor 50, the drive force of the servomotor 50 acts on the connection mechanism 60 and the table 70, and the connection mechanism 60 and table 70 elastically deform. However, since the connection mechanism 60 has low rigidity compared with the table 70, the elastic deformation of the connection mechanism 60 accounts for the majority proportion of the overall elastic deformation. When the connection mechanism 60 elastically deforms, even in a case of causing the servomotor 50 to rotate according to the command value, error in the amount of the elastic deformation amount arises in the position of the table 70. For this reason, in order to eliminate this error, the position command value is corrected by the amount of the elastic deformation of the connection mechanism 60. The elastic deformation amount of the connection mechanism 60 is proportional to the drive force acting on the table 70 at the connection part (herein the nut 603) between the table 70 and the connection mechanism 60, and the drive force can be expressed by the drive torque acting on the connection part. The position command compensation unit 30 has a compensation amount generation part 301 and force estimation part 302. The force estimation part 302 estimates the drive force (drive torque) acting on a drive body in the connection part using the torque command value. The compensation amount generation part 301 generates a compensation amount for compensating the position command value generated by the position command generation unit 10 based on the drive force estimated by the force estimation part 302, and outputs the compensation value to the adder 90.

Figure 2:
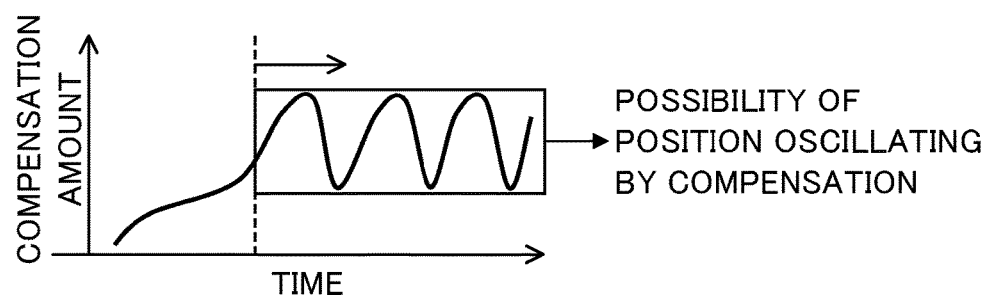
FIG. 2 is a drawing for explaining oscillation of a compensation amount.

The present inventors have found that, in a servomotor control device as the technical premise shown in FIG. 1, even during stop or low-velocity operation, a compensation reacting to the estimated drive force and unrelated to the mechanical operation is applied to the position command value, and oscillation of the compensation amount may occur as shown in FIG. 2. Hereinafter, embodiments of a servomotor control device of the present invention which prevents oscillation of the compensation amount will be explained. The mechanism to which the servomotor control device of the present embodiment explained below is applied is a machine tool such as a laser beam machine, electrical discharge machine or cutting machine; however, the servomotor control device of the present invention is applicable to industrial machinery, etc. such as robots.

First Embodiment

Figure 3:
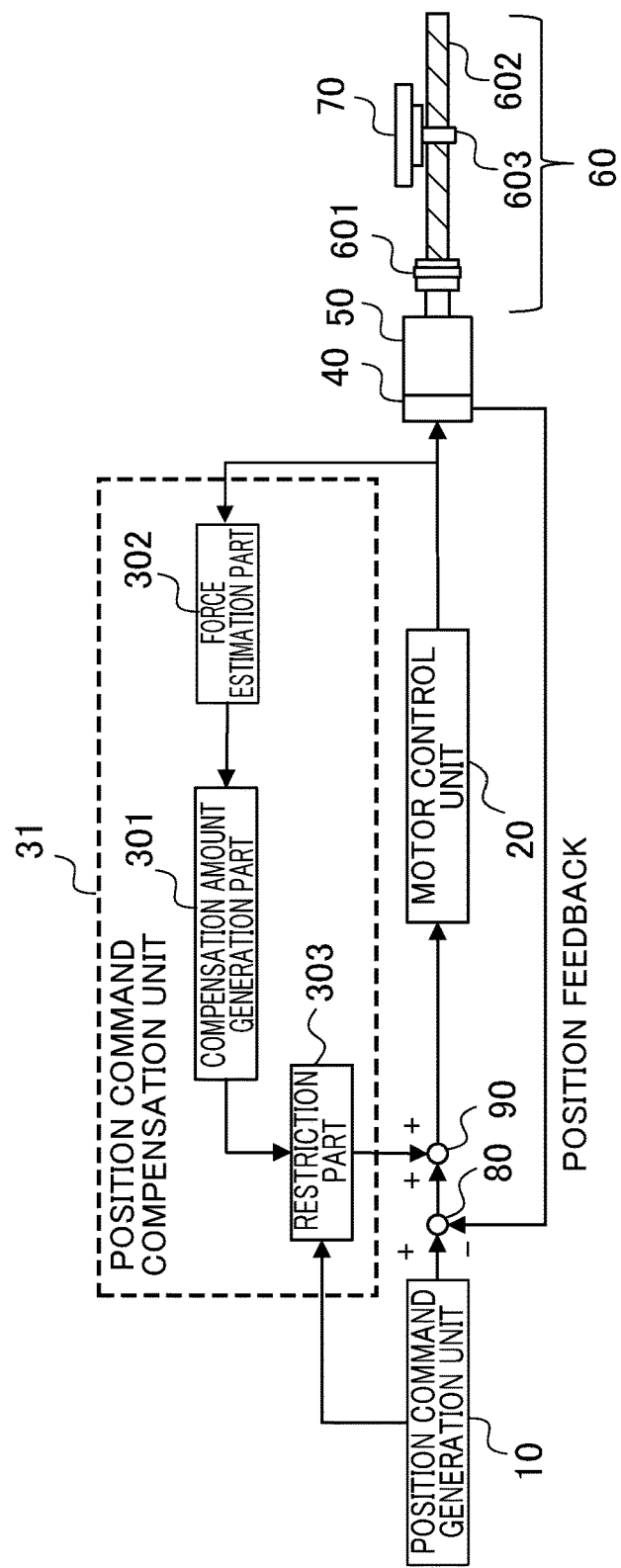
FIG. 3 is a block diagram showing the configuration of a servomotor control device serving as a first embodiment of the present invention.

FIG. 3 is a block diagram showing the configuration of a servomotor control device serving as a first embodiment of the present invention. In FIG. 3, constitutional elements that are identical to constitutional elements of the servomotor device in FIG. 1 are assigned the same reference symbols and explanations thereof will be omitted. As shown in FIG. 3, the position command compensation unit 31 has a restriction part 303 in addition to the configuration of the position command compensation unit 30. The restriction part 303 restricts updating of the compensation amount, when receiving a position command value created by the position command generation unit 10 receives, and the command acceleration of the position command value is no more than a desired value (value of command acceleration includes 0), or when the command velocity of the position command value is no more than a desired value (value of command velocity includes 0). In the following explanation, although a case of restricting the updating of the compensation amount using the command acceleration of the position command value will be explained, updating of the compensation amount may be restricted using the command velocity of the position command value. The restriction part 303 detects whether the command acceleration of the position command value is no more than a desired value (value of command acceleration includes 0), and outputs the compensation amount outputted from the compensation amount generation part 301 based on this detection result to the adder 90. In FIG. 3, the force estimation part 302 estimates the drive force (drive torque) acting on the drive body in the connection part using the torque command value; however, the estimation of the drive force is not limited thereto. For example, as described in Patent Document 1 (Japanese Unexamined Patent Application, Publication No. 2014-109785), the drive force is estimated by further adding acceleration/deceleration torque, disturbance torque, etc. to the drive torque, and may be estimated by calculating the motor torque not using the torque command value, but rather the output of an electric current detection part detecting the motor current.

Figure 4:
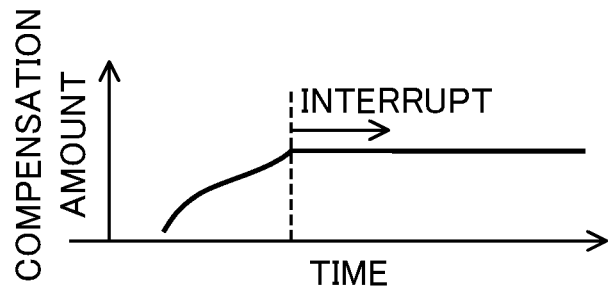
FIG. 4 is a drawing for explaining the interruption of updating of a compensation amount.
Figure 5:
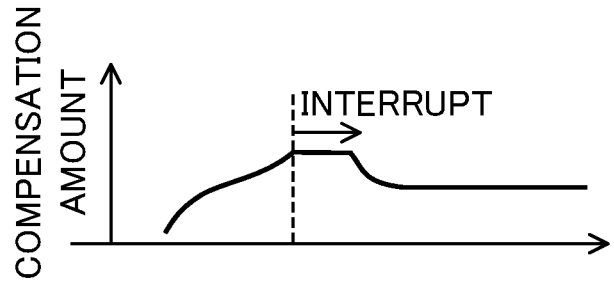
FIG. 5 is a drawing for explaining a case of interrupting updating in which the magnitude of the compensation amount increases.

The restriction part 303, so long as restricting so as to prevent oscillation of the compensation amount shown in FIG. 2, may interrupt the updating of the compensation amount as shown in FIG. 4, or may interrupt updating in which the magnitude of the compensation amount increases, as shown in FIG. 5, and updating in a trend in which the magnitude of the compensation amount decreases is active. By the restriction part 303 enabling updating only in a trend in which the magnitude of the compensation amount decreases, in the case of the compensation amount at the moment of interrupting updating being large, it is done without continuously inputting the large compensation amount. It should be noted that the restriction part 303 may interrupt updating in which the magnitude of the compensation amount decreases, and make updating in a trend in which the magnitude of the compensation amount increases active, and in this case, it is possible to prevent oscillation of the compensation amount shown in FIG. 2.

Figure 6:
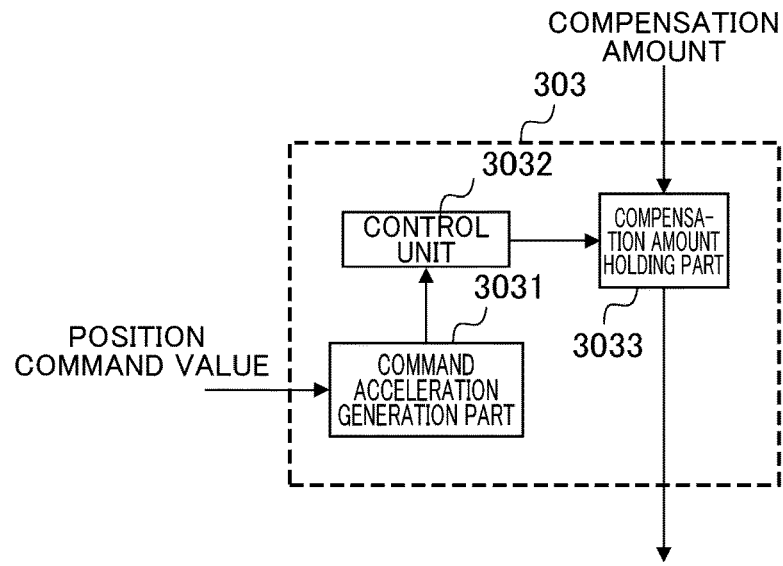
FIG. 6 is a block diagram showing the configuration of a restriction part that performs interrupting of updating of the compensation amount.

Interruption of updating of the compensation amount such as that shown in FIG. 4 is performed by the restriction part 303 of the configuration shown in FIG. 6. In FIG. 6, a command acceleration creation part 3031 obtains the command acceleration of the position command value using the position command value inputted in order, and a control section 3032 determines whether the command acceleration is no more than a desired value (command acceleration includes 0), and in the case of the command acceleration being no more than the desired value, the control section 3032 interrupts updating of the compensation amount held by a compensation amount holding part 3033. In this case, a constant compensation amount is outputted as shown in FIG. 4. In the case of the command acceleration exceeding a desired value, the control section 3032 sustains updating of the compensation amount. In the case of using the command velocity of the position command value in place of the command acceleration of the position command value, the command acceleration generation section 3031 is replaced by the command velocity generation part.

Figure 7:
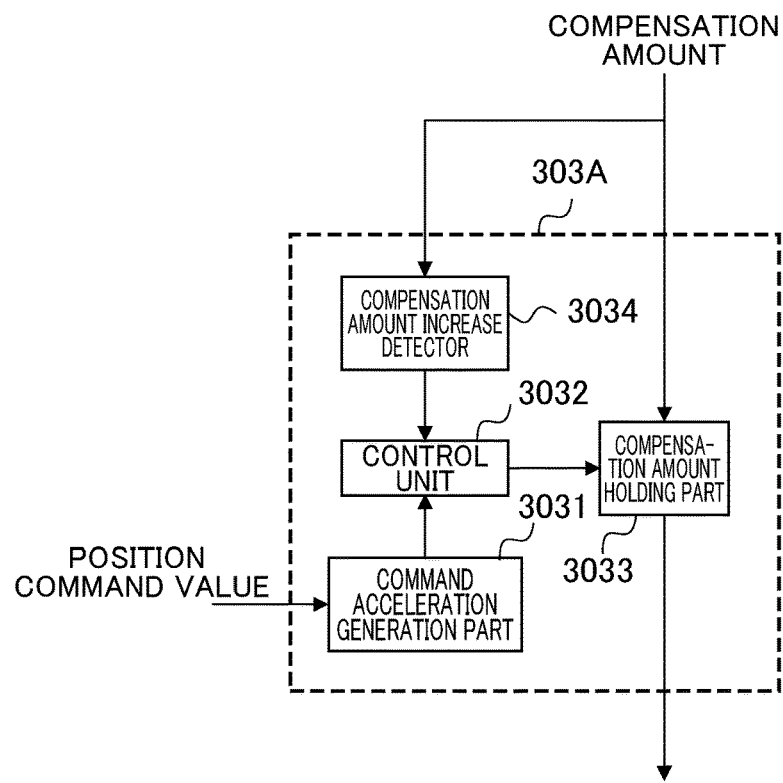
FIG. 7 is a block diagram showing the configuration of the restriction part that performs interrupting of updating in which the magnitude of the compensation amount increases.

The interruption of updating in which the magnitude of the compensation amount increases such as that shown in FIG. 5 is performed by a restriction part 303A of the configuration shown in FIG. 7. In FIG. 7, the command acceleration generation section 3031 obtains the command acceleration of the position command value using the position command value inputted in order, and the control section 3032 determines whether the command acceleration is no more than a desired value (value of the command acceleration includes 0). A compensation amount increase detector 3034 detects whether the magnitude of the compensation amount is increasing, and sends a detection signal to the control part 3020. Then, the control section 3032 interrupts updating of the compensation amount held by the compensation amount holding amount 3033, in the case of the command acceleration being no more than a desired value (including 0), and the magnitude of the compensation amount increasing. The control section 3032 sustains the updating of the compensation amount in the case of the command acceleration exceeding a desired value, or the case of the magnitude of the compensation amount decreasing. The control section 3032 restarts updating when becoming a trend in which the magnitude of the compensation amount decreases after interruption of the compensation amount. In the case of using the command velocity of the position command value in place of the command acceleration of the position command value, the command acceleration generation section 3031 is replaced with the command velocity generation part. In addition, in the case of determining whether the magnitude of the compensation amount is decreasing, the compensation amount increase detector 3034 is replaced with the compensation amount decrease detector.

Figure 8:
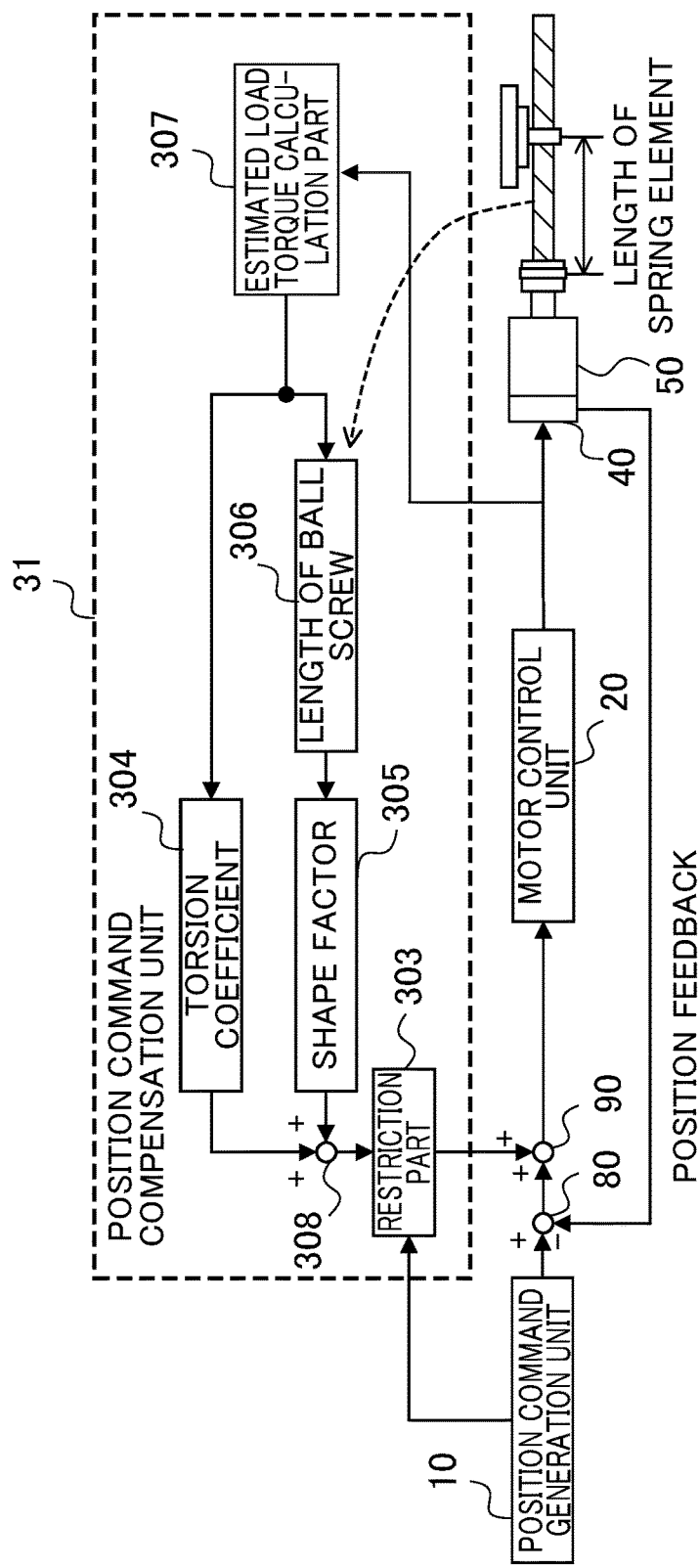
FIG. 8 is a block diagram showing the configuration of a servomotor control device including one configuration example of a position command compensation unit.

FIG. 8 is a block diagram showing the configuration of the servomotor control device including one configuration example of the position command compensation unit 31. The estimated load torque calculation part 307 in FIG. 8 corresponds to the force estimation part 302 in FIG. 3, and a twist coefficient multiplier 304, ball screw length multiplier 306, shape factor multiplier 305 and adder 308 correspond to the compensation amount generation part 301. The shape factor shows the expansion amount per unit length of the ball screw. In the present embodiment, based on the load torque estimated, the twist elastic deformation around the rotation axis and the stretch elastic deformation in the axial direction generated in the connection mechanism (coupling, ball screw) are calculated, and the lost motion due to elastic deformation is corrected in the position command value. At this time, the elastic deformation in the axial direction depends on the distance from the servomotor until the driven body, and this distance is estimated according to the integrated value of the movement position. When defining the estimated load torque outputted from the estimated load torque calculation part 307 as T, and the twist coefficient of the twist coefficient multiplier as $\alpha$, the compensation amount related to the twist of the connection part becomes $\alpha \cdot T$, and this becomes the output of the twist coefficient multiplier 304. In addition, when defining the estimated load torque outputted form the estimated load torque calculation part 307 as T, the length of the ball screw in the ball screw length multiplier 306 as d, and the shape factor in the shape factor multiplier 305 as $\beta$, the compensation amount related to the stretch of the ball screw becomes $d \cdot \beta \cdot T$, and this becomes the output of the shape factor multiplier 305. Then, the total compensation amount becomes $\alpha \cdot T + d \cdot \beta \cdot T$, and this becomes the output of the adder 308.

Figure 9:
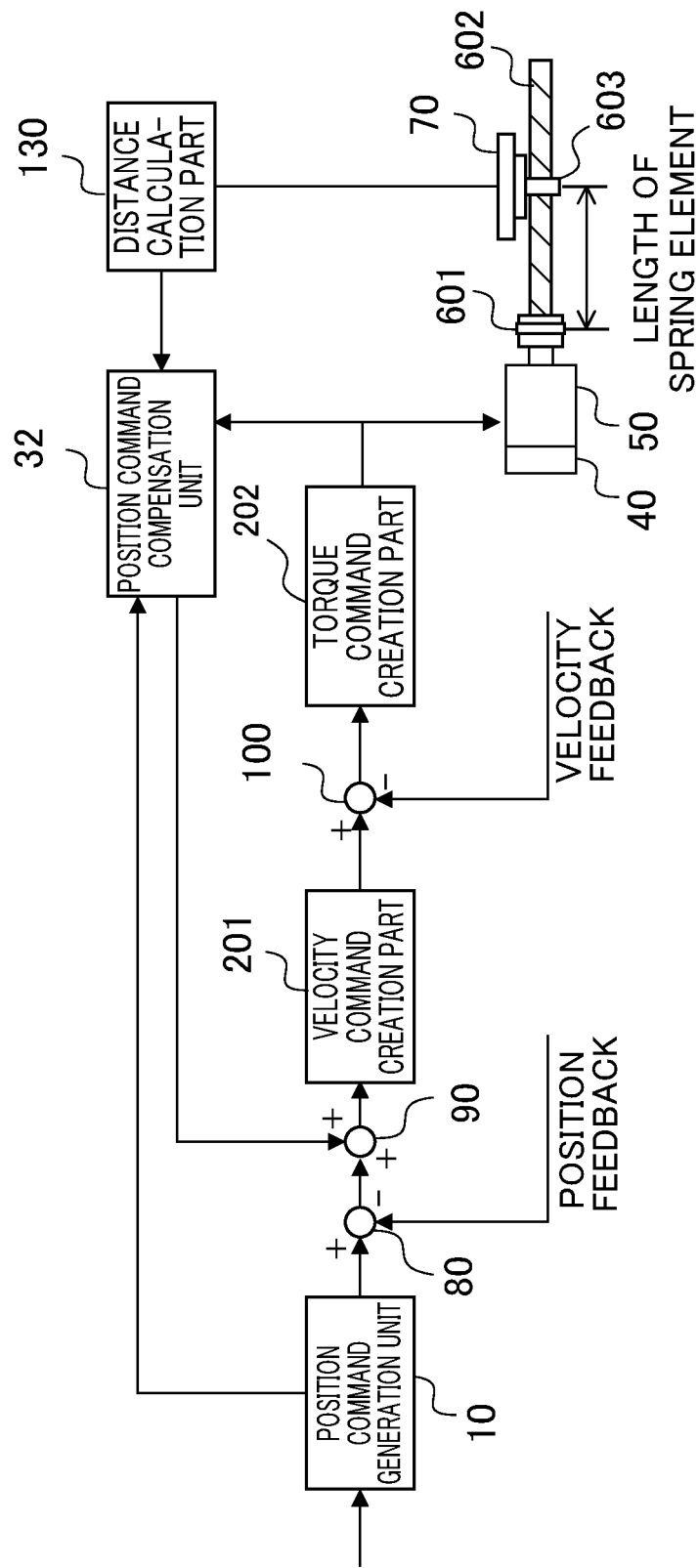
FIG. 9 is a block diagram showing one configuration example of a motor control unit and the configuration of a servomotor control device including a distance calculation unit that obtains the length of a ball screw (length of spring element)
Figure 10:
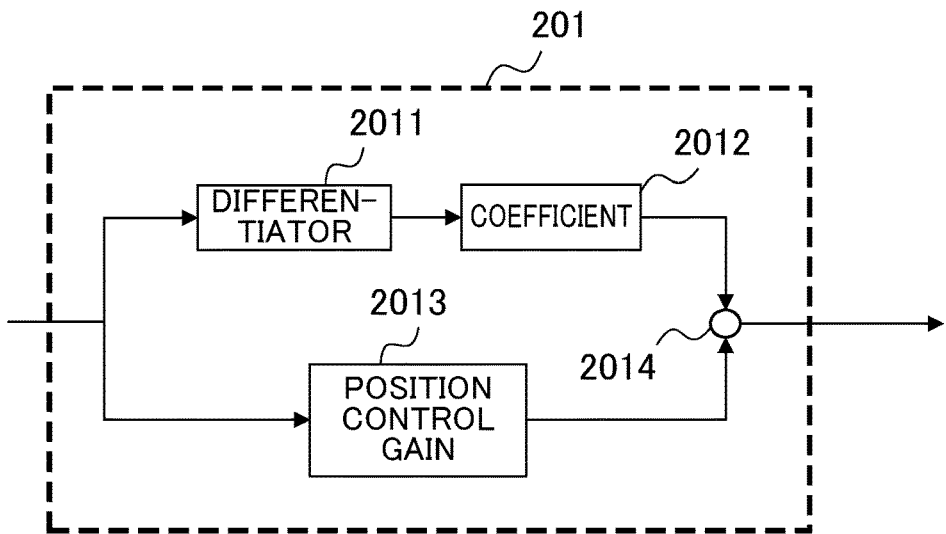
FIG. 10 is a block diagram showing one configuration example of a velocity command creation unit.
Figure 11:
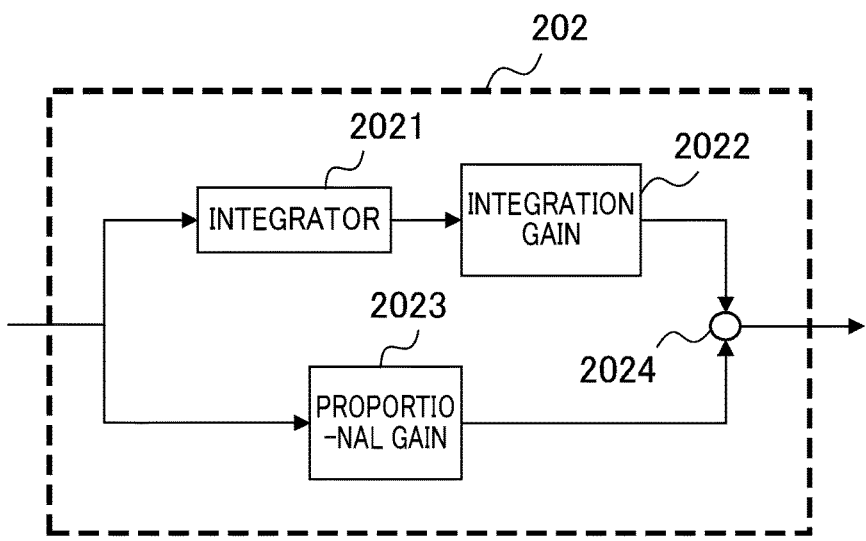
FIG. 11 is a block diagram showing one configuration example of a torque command creation unit.

FIG. 9 is a block diagram showing one configuration example of the motor control unit 20 and the configuration of the servomotor control device including the distance calculation part 130 which obtains the length of the ball screw (length of spring element). The length of the ball screw (length of spring element) multiplied by the ball screw length multiplier 306 in FIG. 8 is calculated by the distance calculation unit 130. The motor control unit 20 in FIG. 8 has a velocity command creation part 201, subtraction part, torque command creation part 202 and subtracter 100. FIG. 10 is a block diagram showing one configuration example of the velocity command creation part 201. As shown in FIG. 9, the position command generation unit 10 creates the position command value, obtains the difference between the position command value and detected position from position feedback by the subtracter 80, and adds the compensation amount to this difference by the adder 90. The adder 90 inputs the difference to which the compensation amount was added to the differentiator 2011 and position control gain 2013 of the velocity command creation part 201 shown in FIG. 10. To the output of the differentiator 2011, the coefficient is multiplied by the coefficient part 2012. The adder 2014 outputs the added value of the output of the coefficient part 2012 and the output of the position control gain 2013 as the velocity command value. The subtracter 100 obtains the difference between the velocity command value and the detected velocity from velocity feedback and outputs to the torque command creation part 202. FIG. 11 is a block diagram showing one configuration example of the torque command creation part 202. The torque command creation part 202 includes a proportional gain 2023 and integrator 2021 connected with the subtracter 100, an integration gain 2022 connected with the integrator 2021, and an adder 2024 that adds the output of the proportional gain 2023 and the output of the integration gain 2022, and outputs to the servomotor 50 as the torque command. The integrator 2021 integrates the input. The integration gain 2022 multiplies the coefficient by the output of the integrator 2021. The proportional gain 2023 multiplies the coefficient by the input. It should be noted that the integration gain 2022 and integrator 2021 may be changed in arrangement sequence.

Figure 12:
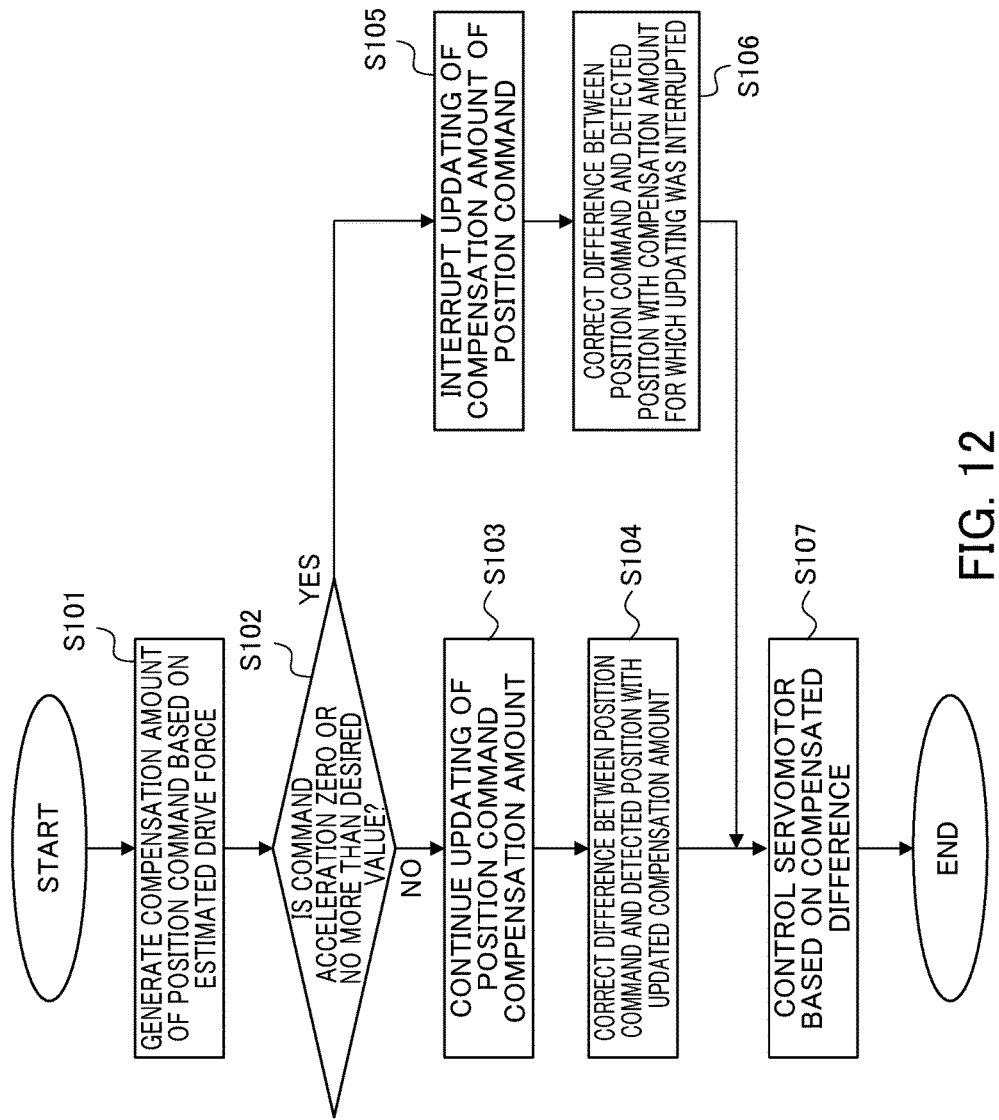
FIG. 12 is a flowchart showing an interruption operation for updating shown in FIG. 4 of the servomotor control device shown in FIG. 3.

FIG. 12 is a flowchart showing the interruption operation of updating shown in FIG. 4 of the servomotor control device shown in FIG. 3. In Step S101, the force estimation part 302 and the compensation amount generation part 301 generate the compensation amount for the position command value based on the estimated drive force. In Step S102, the control section 3032 of the restriction part 303 determines whether the command acceleration of the position command value is no more than a desired value (including 0), and in the case of the command acceleration being no more than the desired value (value of command acceleration includes 0) (case of YES in Step S102), interrupts the updating of the compensation amount being held by the command amount holding section 3033 in Step S105. Then, in Step S106, the adder 90 corrects the difference between the position command value from the position command generation unit 10 and the detected position of position feedback with the command amount for which updating was interrupted.

Figure 13:
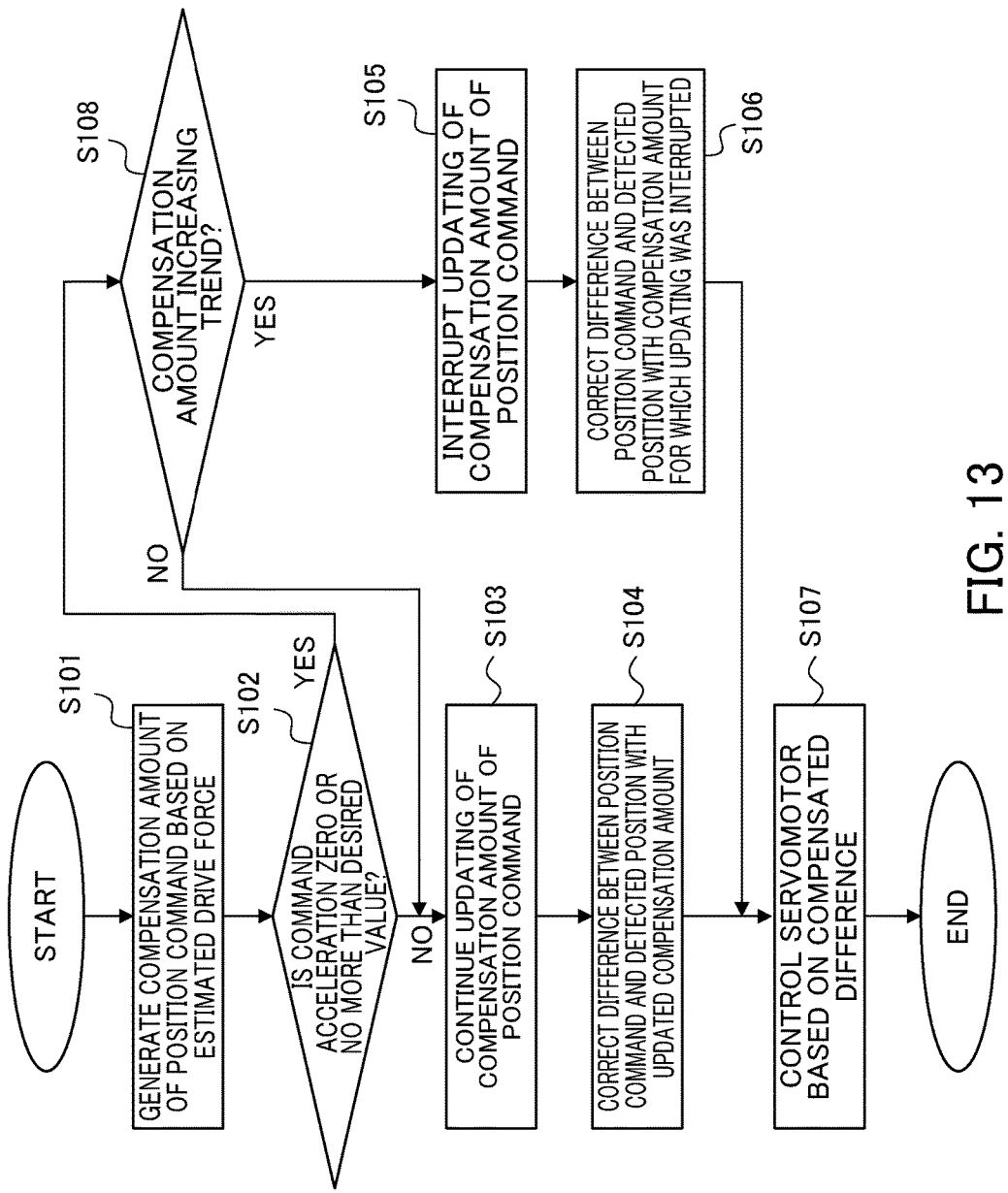
FIG. 13 is a flowchart showing an interruption operation of updating shown in FIG. 5 of the servomotor control device shown in FIG. 3.

On the other hand, in Step S102, in the case of the command acceleration exceeding a desired value (case of NO in Step S102), the control section 3032 continues updating of the compensation amount in Step S103, and the adder 90 corrects the difference between the position command value from the position command generation unit 10 and the detected position of the position feedback with the updated compensation amount in Step S104. Then, the motor control unit 20 controls the servomotor 50 based on the difference between the position command value and detected position, corrected in Step S104 or Step S106. FIG. 13 is a flowchart showing the interruption operation for updating shown in FIG. 5 of the servomotor control device shown in FIG. 3. In the flowchart of FIG. 13, Step S108 which determines whether the magnitude of the compensation amount increases is added to the flowchart of FIG. 12. In the case of the command acceleration of the position command value being no more than a desired value (including 0) (YES in Step S102), and the magnitude of the compensation amount increasing (YES in Step S108), the control section 3032 interrupts the updating of the compensation amount being held by the compensation amount holding part 3033 in Step S105. In the case of the command acceleration exceeding the desired value (NO in Step S102) or the case of the magnitude of the compensation amount decreasing (NO in Step S108), the control section 3032 continues updating of the compensation amount in Step S103.

Second Embodiment

Figure 14:
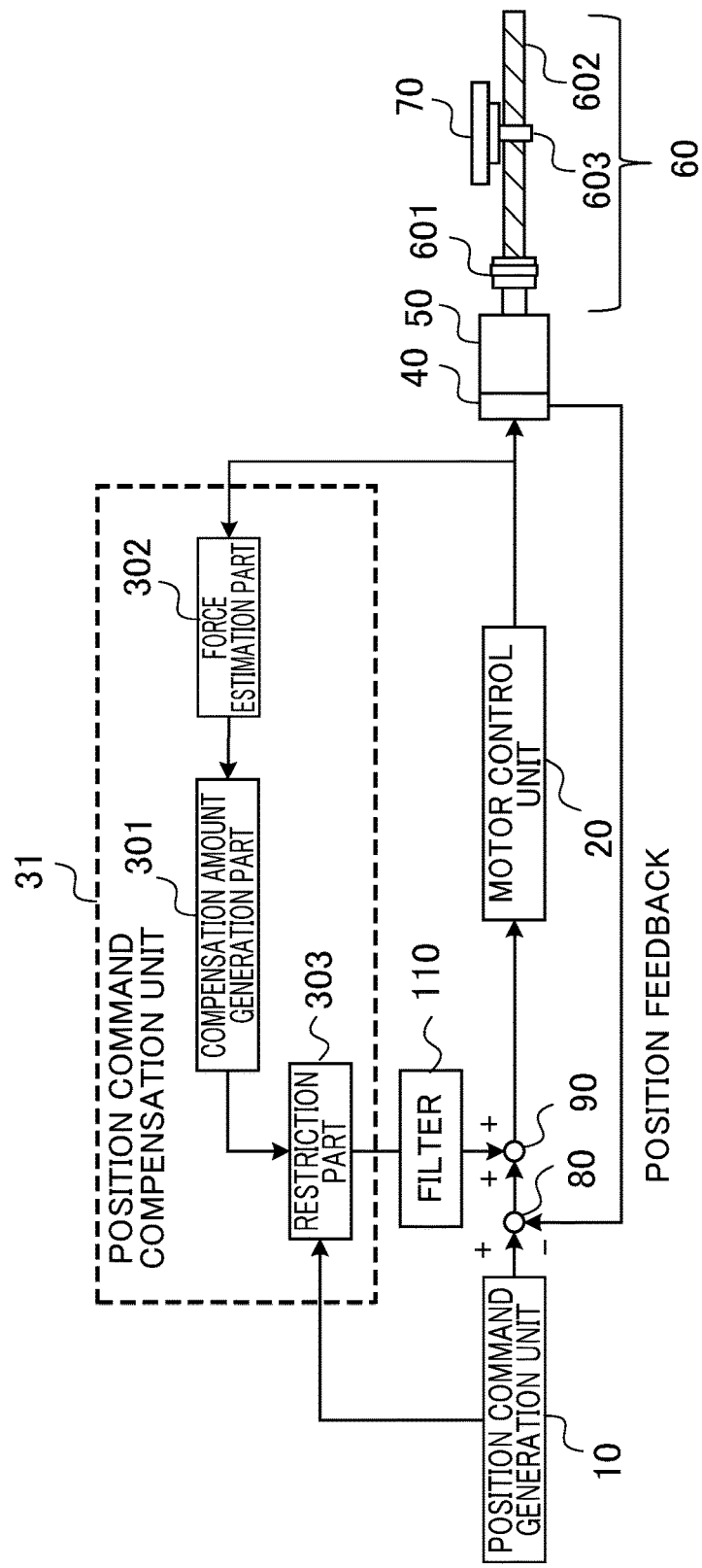
FIG. 14 is a block diagram showing the configuration of a servomotor control device serving as a second embodiment of the present invention.

In the servo control device of the first embodiment, when interrupting the updating of the compensation amount, the compensation amount discontinuously changes when restarted. In order to prevent discontinuity of this compensation amount, a filter 110 is provided to the output of the position command compensation unit 31. FIG. 14 is a block diagram showing the configuration of a servomotor control device serving as a second embodiment of the present invention. The configuration of the servomotor control device of FIG. 14 is the same as the configuration of the servomotor control device in FIG. 3 when excluding the point of the filter 110 being provided, and the same constitutional members are assigned the same reference symbols, and explanations thereof will be omitted. It is possible to use a low-pass filter as the filter 110.

Figure 15:
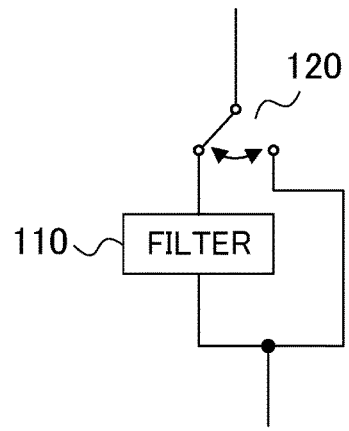
FIG. 15 is a drawing showing filters and a switch for switching filters.
Figure 16:
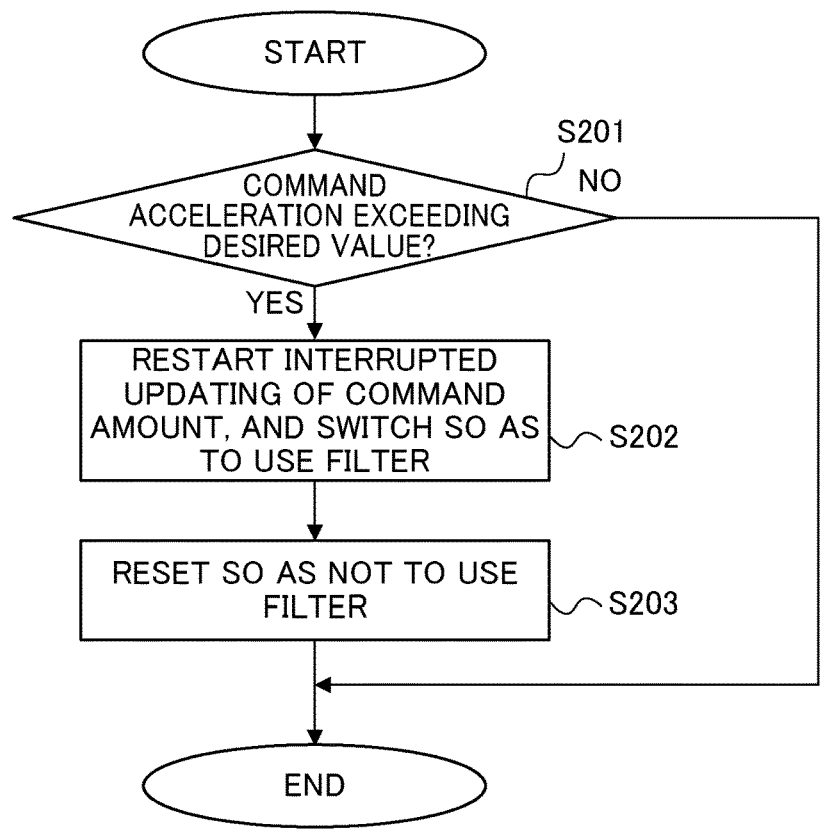
FIG. 16 is a flowchart showing a switching operation of filters.

The filter 110 connects between the restriction part 303 and adder 90 only during restart of updating of the compensation amount by way of the selector switch 120 shown in FIG. 15, and after restart may be configured so as to connect between the restriction part 303 and adder 90 without going through the filter 110. Switching of the selector switch 120 is performed in the case of restarting the interrupted updating of the compensation amount, when the control section 3032 shown in FIGS. 6 and 7 determines that the command acceleration of the position command value has exceeded the desired value using the output of the command acceleration generation section 3031. FIG. 16 is a flowchart showing the switching operation of the filter 110. In Step S201, the control section 3032, in the case of determining that the command acceleration of the position command value exceeds the desired value (YES in Step S201), restarts updating of the compensation amount interrupted in Step S202, switches the selector switch 120 so as to use the filter, and subsequently, the control section 3032 switches the selector switch 120 so as not to use the filter in Step S203, when discontinuity of the compensation amount was eliminated.

Third Embodiment

Figure 17:
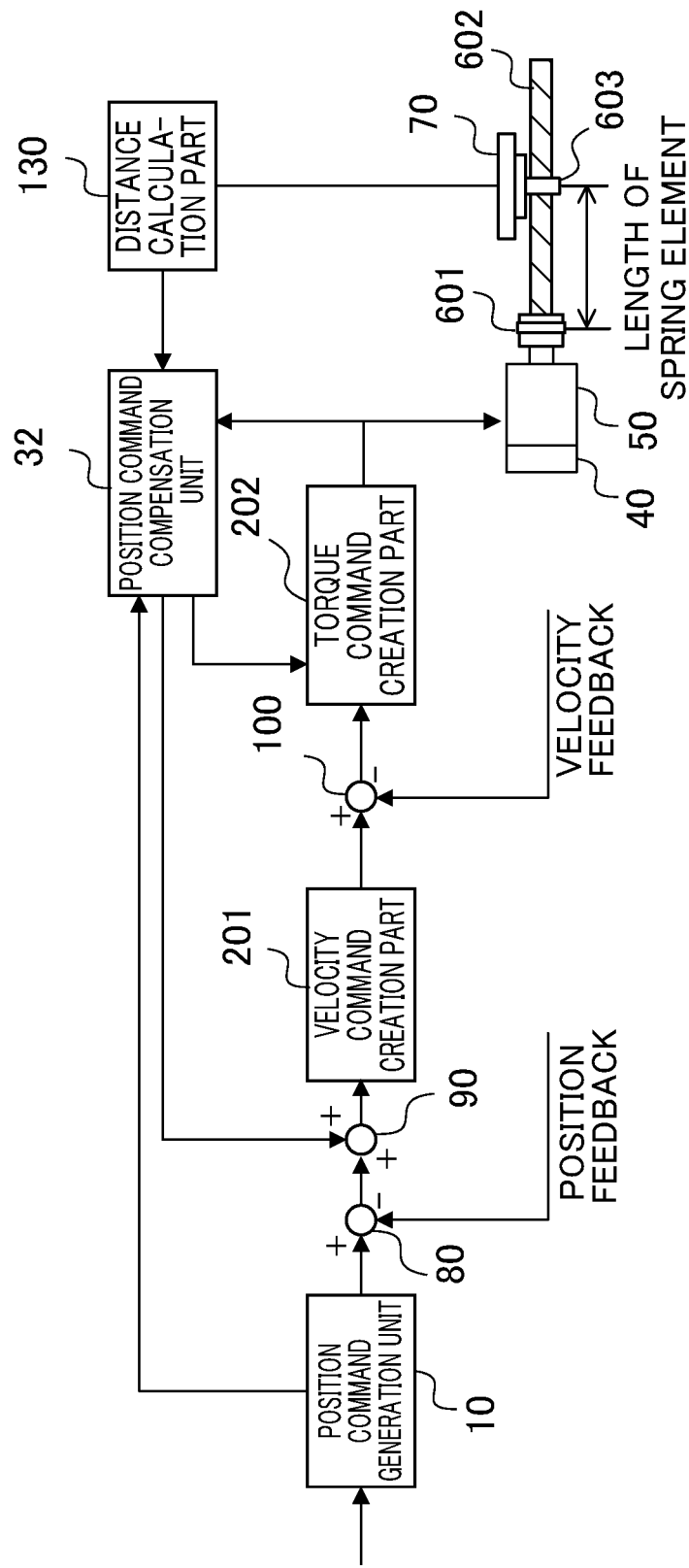
FIG. 17 is a block diagram showing the configuration of a servomotor control device serving as a third embodiment of the present invention.
Figure 18:
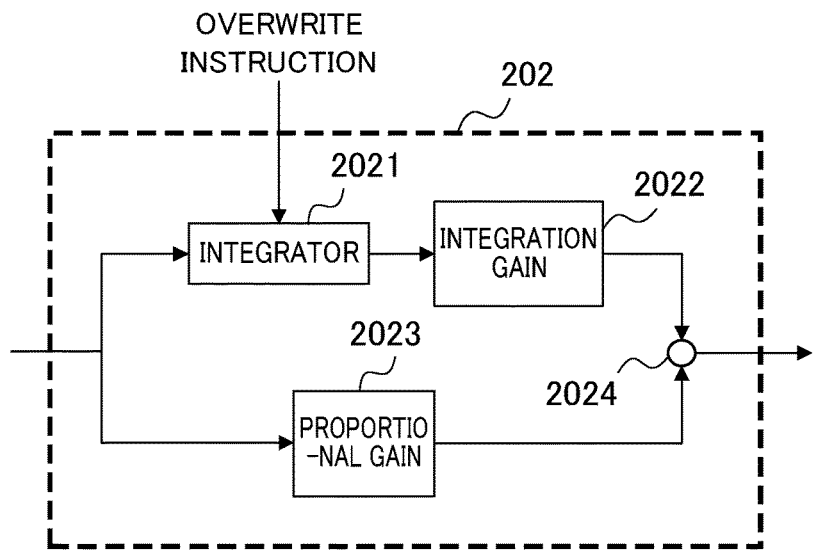
FIG. 18 is a block diagram showing the configuration of a torque command creation unit.

The servo control device of the second embodiment provides the filter 110 to the output of the position command compensation unit 31 in order to prevent discontinuity of the compensation amount; however, it may be configured so as to perform overwriting of the integrator 2021 of the torque command creation part 202 in place of the filter and not to produce discontinuity in the torque command value. When the compensation amount compensating the position command value during restart enters the adder 90, a change in the velocity command value is generated. Overwriting of the integrator is performed so that the torque command value does not change due to the change in this velocity command value, whereby it is configured so that the torque command value is no longer discontinuous. FIG. 17 is a block diagram showing the configuration of a servomotor control device serving as a third embodiment of the present invention. The configuration of the servomotor control device in FIG. 17 is the same as the configuration of the servomotor control device in FIG. 9 when excluding the point of the position command compensation unit 32 sending a switching instruction of integrators to the torque command creation part 202, and the same reference symbols are assigned for the same constitutional members, and explanations thereof will be omitted. FIG. 18 is a block diagram showing the configuration of the torque command creation part 202. As shown in FIG. 18, the overwriting instruction from the position command compensation part 32 is sent to the integrator 2021.

The overwriting instruction is sent, when the control section 3032 shown in FIGS. 6 and 7 determines that the command acceleration of the position command value exceeds the desired value from the output of the command acceleration generation section 3031, and when restarting updating of the compensation amount that was interrupted. The control section 3032 instructs overwriting of the integrator 2021 in the following way. The torque command value TCMD is expressed by Formula 1, when defining Vcmd as the velocity command value, Vfb as the detected velocity, kp as the proportional gain, and ki and the integration gain.

$$TCMD = \Sigma(Vcmd - Vfb) \times ki + (Vcmd - Vfb) \times kp \quad \text{[Math. 1]}$$

When restarting the updating of the compensation amount from updating interrupt of the compensation amount, the torque command value TCMD becomes TCMD (2) from TCMD (1).

$$TCMD(1) = \Sigma(Vcmd(1) - Vfb(1)) \times ki + (Vcmd(1) - Vfb(1)) \times kp \ TCMD(2) = \Sigma(Vcmd(2) - Vfb(2)) \times ki + (Vcmd(2) - Vfb(2)) \times kp = (TCMD(1) + (Vcmd(2) - Vfb(2))) \times ki + (Vcmd(2) - Vfb(2)) \times kp \quad \text{[Math. 2]}$$

In the present embodiment, TCMD(1)+(Vcmd(2)−Vfb (2)) of the torque command value TCMD(2) is overwritten by the following Formula 3.

$$(TCMD(1) - (Vcmd(2) - Vfb(2)) \times kp)/ki \quad \text{[Math. 3]}$$

When this is done, the overwritten torque command value TCMD'(2) is the same as TCMD(1), and discontinuity of the torque command does not arise.

Figure 19:
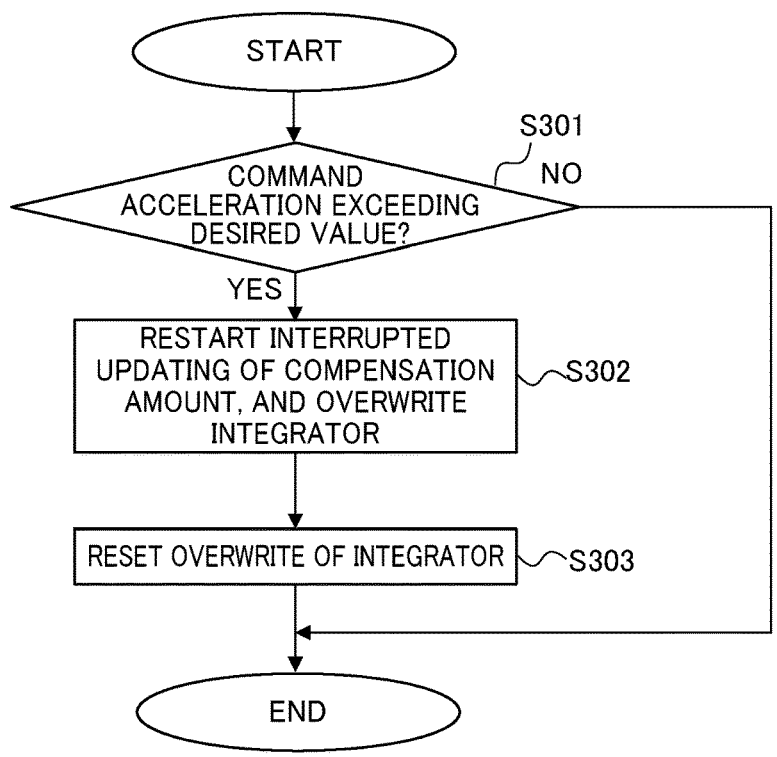
FIG. 19 is a flowchart showing a switching operation of integrators.

FIG. 19 is a flowchart showing the switching operation of the integrator 2021. In the case of the control section 3032 determining that the command acceleration of the position command value exceeds the desired value in Step S301 (YES in Step S301), the control section 3032 restarts updating of the compensation amount that was interrupted, and performs overwriting of the integrator in Step S302. Subsequently, when discontinuity of the compensation amount is eliminated, the control section 3032 resets the overwriting of the integrator in Step S303. Although embodiments of the present invention have been explained above, the servomotor control device can realize the entirety or part of the functions thereof by hardware, software, or combinations thereof. Herein, realizing by way of software indicates the matter of being realized by a computer reading and executing programs. In the case of constituting by hardware, a part or the entirety of the compensation amount generation part 301, force estimation part 302, restriction part 303, position command generation unit 10 and motor control unit 20 of the servomotor control device can be configured by circuits, for example, integrated circuits (IC) such as LSI (large Scale Integrated Circuit), ASIC (Application Specific Integrated Circuit), gate array, and FPGA (Field Programmable Gate Array).

In the case of realizing by software, it is possible to configure a part or the entirety of the servomotor control device by a computer including a CPU and a storage unit such as a hard disk and ROM storing programs, and then execute operations of a part or the entirety of the servomotor control device by storing the information required in computation in a second storage unit such as RAM, and executing processing in accordance with the block diagrams of FIGS. 3 and 6 to 11 and program following the flowcharts of FIGS. 12 and 13, the block diagram of FIG. 14 and a program following the flowchart of FIG. 16, and the block diagram of FIGS. 17 and 18 and a program following the flowchart of FIG. 19. The programs can be read into a storage unit such as a hard disk from a computer readable recording medium on which the programs are recorded.

The programs can be stored using various types of computer readable storage media, and provided to the computer. The computer readable medium includes tangible storage media. The compute readable medium includes non-transitory computer readable storage media. Examples of non-transitory computer-readable recording media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although the respective embodiments and examples of the present invention have been explained above, the present invention is not to be limited to the aforementioned respective embodiments and examples, and for one skilled in the art, it is possible to modify or change into various forms within a scope not departing from the gist of the present invention, based on the disclosure in the claims, and these modified examples or changed examples also fall under the scope of rights of the present invention.

EXPLANATION OF REFERENCE NUMERALS 10 position command generation unit
20 motor control unit
30, 31 position command compensation unit
40 encoder
50 servomotor
60 connection mechanism
70 table
301 compensation amount generation part
302 force estimation part
303 restriction part

What is claimed is:

1. A servomotor control device, comprising:
a servomotor;
a driven body configured to be driven by the servomotor;
a connection mechanism configured to connect the servomotor and the driven body, and transmit power of the servomotor to the driven body;
a position command generation unit configured to generate a position command value for the driven body;
a motor control unit configured to control the servomotor using the position command value; and
a position command compensation unit including a force estimation part configured to estimate a drive force acting on the driven body at a connecting part with the connection mechanism, and a compensation amount generation part configured to generate a compensation amount for compensating the position command value generated by the position command generation unit, based on a drive force estimated by the force estimation part,
wherein the position command compensation unit includes a restriction part configured to restrict updating of the compensation amount, when a command acceleration of the position command value is no more than a desired value, or when a command velocity of the position command value is no more than a desired value.

2. The servomotor control device according to claim 1, wherein restriction of the updating of the compensation amount by the restriction part interrupts updating in which the magnitude of the compensation amount increases.

3. The servomotor control device according to claim 1, wherein restriction of the updating of the compensation amount by the restriction part interrupts the updating of the compensation amount.

4. The servomotor control device according to claim 1, wherein the restriction part includes a filter configured to suppress a change from a compensation amount that was restricted, to a compensation amount after updating, when restarting the updating of the compensation amount.

5. The servomotor control device according to claim 1,
wherein the motor control unit includes a velocity command creation part and a torque command creation part,
wherein the torque command creation part includes at least an integrator that integrates a speed deviation, and
wherein the restriction part performs overwriting of the integrator when restarting the updating of the compensation amount.

6. A servomotor control method for controlling a servomotor in a servomotor control device including the servomotor;
a driven body configured to be driven by the servomotor; and
a connection mechanism configured to connect the servomotor and the driven body, and transmit power of the servomotor to the driven body, the method comprising the steps of:
generating a position command value for the driven body;
estimating drive force acting on the driven body at a connecting part with the connection mechanism;
generating a compensation amount for compensating the position command value based on the drive force thus estimated;
restricting updating of the compensation amount when a command acceleration of the position command value is no more than a desired value, or when a command velocity of the position command value is no more than a desired value; and
controlling the servomotor using the position command value for which updating was restricted.

7. The servomotor control method according to claim 6, wherein restricting of the updating of the compensation amount is interrupting updating in which the magnitude of the compensation amount increases.

8. The servomotor control method according to claim 6, wherein restricting of the updating of the compensation amount is interrupting the updating of the compensation amount.

9. The servomotor control method according to claim 6, further comprising a step of suppressing, by way of a filter, a change from a compensation amount that was restricted, to a compensation amount after updating, when restarting the updating of the compensation amount.

10. The servomotor control method according to claim 6, further comprising the steps of:
    creating a velocity command using the position command value in which updating was restricted, creating a torque command using the velocity command thus created, and controlling the servomotor using the torque command, wherein the creating of the torque command is performed using an integrator that at least integrates a speed deviation; and
    performing overwriting of the integrator when restarting the updating of the compensation amount.

11. A non-transitory computer-readable recording medium encoded with a servomotor control program which enables a computer to execute servomotor control in a servomotor control device that includes a servomotor,
    a driven body configured to be driven by the servomotor, and
    a connection mechanism configured to connect the servomotor and the driven body, and transmit power of the servomotor to the driven body, the program causing the computer to execute processing of:
    generating a position command value for the driven body;
    estimating drive force acting on the driven body at a connecting part with the connection mechanism;
    generating a compensation amount for compensating the position command value based on the drive force thus estimated;
    restricting updating of the compensation amount when a command acceleration of the position command value is no more than a desired value, or when a command velocity of the position command value is no more than a desired value; and
    controlling the servomotor using the position command value for which updating was restricted.

* * * * *